Patented Mar. 1, 1927.

1,619,185

UNITED STATES PATENT OFFICE.

JOSEPH BRESLAUER, OF GENEVA, SWITZERLAND, ASSIGNOR TO COMPAGNIE DE L'AZOTE ET DES FERTILISANTS S. A., OF GENEVA, SWITZERLAND, A SWISS FIRM.

PROCESS FOR REMOVING THE DUST FROM CALCIUM CYANAMIDE AND DEODORIZING THE SAME.

No Drawing. Application filed January 8, 1926, Serial No. 80,104, and in Switzerland January 10, 1925.

Powdered calcium cyanamide, as obtained by grinding up blocks of calcium cyanamide produced by treating carbide with nitrogen, offers besides other drawbacks the disadvantage of developing, when it is in contact with humid air, acetylene and phosphuretted hydrogen coming from residual carbide and metallic phosphides contained in the raw material.

The free calcium oxide contained in considerable proportions in this fertilizer becomes a source of great disadvantage when it is spread over the fields, especially because the dust which develops troubles the user and compels him to take all kinds of precautions against the attack of the caustic or noxious dust.

For that reason the manufacturers of calcium cyanamide have at all times tried to remove the dust from the cyanimide either by converting it into granules or by adding to it oily products such as for instance mineral oils. Other means which are more or less complicated and involve more or less deep modifications of the cyanamide have been hitherto employed by a certain number of manufacturers and are described in the special literature especially in an article of Professor Caro in the Chemiker Zeitung of the year 1922.

Now, all these means are more or less imperfect, according to the opinion of the commission which has been charged to examine the same. They need very often considerable expense and lead to products which contain a percentage of nitrogen, which is smaller than that of the calcium cyanamide employed.

It has been several times proposed to hydrate the calcium cyanamide by means of water. Attempts have also been made to convert the free calcium oxide contained in the commercial calcium cyanamide into calcium carbonate but the results obtained until now in those two directions mentioned could not be considered as conclusive ones.

The treatment by water as well as that by carbonic acid have always sensibly diminished the content of nitrogen of the original cyanamide.

The inventor has found that the dust may be removed from calcium cyanamide and that the latter may be deodorized by treating it simultaneously by a current of carbon dioxide ($CO_2$) and superheated steam at a temperature above 100° and below 300° C.

The product obtained by this treatment does not possess any of the drawbacks mentioned above and has moreover lost neither nitrogen nor any amount of the cyanamide operated upon.

The process is preferably carried out in a rotary drum into which superheated steam and a current of carbon dioxide ($CO_2$) are simultaneously introduced. The most advantageous working temperature lies between 200 and 300 degrees centigrade. The duration of the operation is generally less than one hour.

The superheated steam being maintained during its passage through the drum at a temperature above 100° C., preferably between 200 and 300° C., no condensation of water upon the cyanamide will be possible and the eventual losses of nitrogen may be easily avoided by recovering the ammonia by means of a vessel containing acid.

Owing to the short duration of the operation of these losses are then negligible.

On the other hand the carbonic acid attacks the portions of the calcium cyanamide which are the richest in free calcium oxide and the small cover of carbonate of calcium formed thereby removes from the cyanamide powder its properties of great causticity.

Instead of treating the calcium cyanamide in one sole operation in the said drum or in another suitable apparatus, with superheated steam and carbon dioxide, one may also preliminarily hydrate the free calcium oxide by sprinkling about 10 per cent water over it and by treating it with superheated steam and $CO_2$ only in a second phase of the operation.

During the subsequent treatment with superheated steam and carbonic acid, the greater part of the sprinkled water is eliminated and the final diminution of the contents of nitrogen remains very much less than to that observed in the other hitherto known processes.

One may employ instead of water, aqueous solutions of agglutinant products and instead of obtaining the cyanamide in the form of a powder one may obtain it in granulated or compressed form or lozenges and the like.

I claim:

1. A process for removing the dust from calcium cyanamide and of deodorizing the latter consisting in treating this cyanamide simultaneously with a current of carbon dioxide and superheated steam for a period of time insufficient to convert a substantial amount of said cyanamide to ammonia.

2. A process for removing the dust from calcium cyanamide and of deodorizing the latter consisting in treating this cyanamide simultaneously with a current of carbon dioxide and steam superheated to a temperature above 100 degrees centigrade and below 300 degrees centigrade for a period of time insufficient to convert a substantial amount of said cyanamide to ammonia.

3. A process for removing the dust from calcium cyanamide and of deodorizing the later consisting in treating in a rotative drum this cyanamide simultaneously with a current of carbon dioxide and steam superheated to a temperature above 100 degrees centigrade and below 300 degrees centigrade for a period of time insufficient to convert a substantial amount of said cyanamide to ammonia.

4. A process for removing the dust from calcium cyanamide and of deodorizing the latter consisting in sprinkling water over the said calcium cyanamide and then treating it simultaneously with superheated steam and carbon dioxide for a period of time insufficient to convert a substantial amount of said cyanamide to ammonia.

5. A process for removing the dust from calcium cyanamide and of deodorizing the latter consisting in mixing the cyanamide with an aqueous solution of an agglutinant substance which facilitiates the removing of the dust, in treating thereafter the mixture with superheated steam and carbon dioxide for a period of time insufficient to convert a substantial amount of said cyanamide to ammonia.

6. A process for removing the dust from calcium cyanamide which comprises treating said calcium cyanamide with a carbon dioxide and superheated steam at a temperature between 100° and 300° centigrade for a period less than one hour.

In testimony whereof I affix my signature.

JOSEPH BRESLAUER.